Oct. 27, 1959     J. R. COBB, JR     2,910,521
RECOVERY OF HYDROGEN FLUORIDE FROM A HYDROCARBON MIXTURE
Filed Oct. 22, 1956
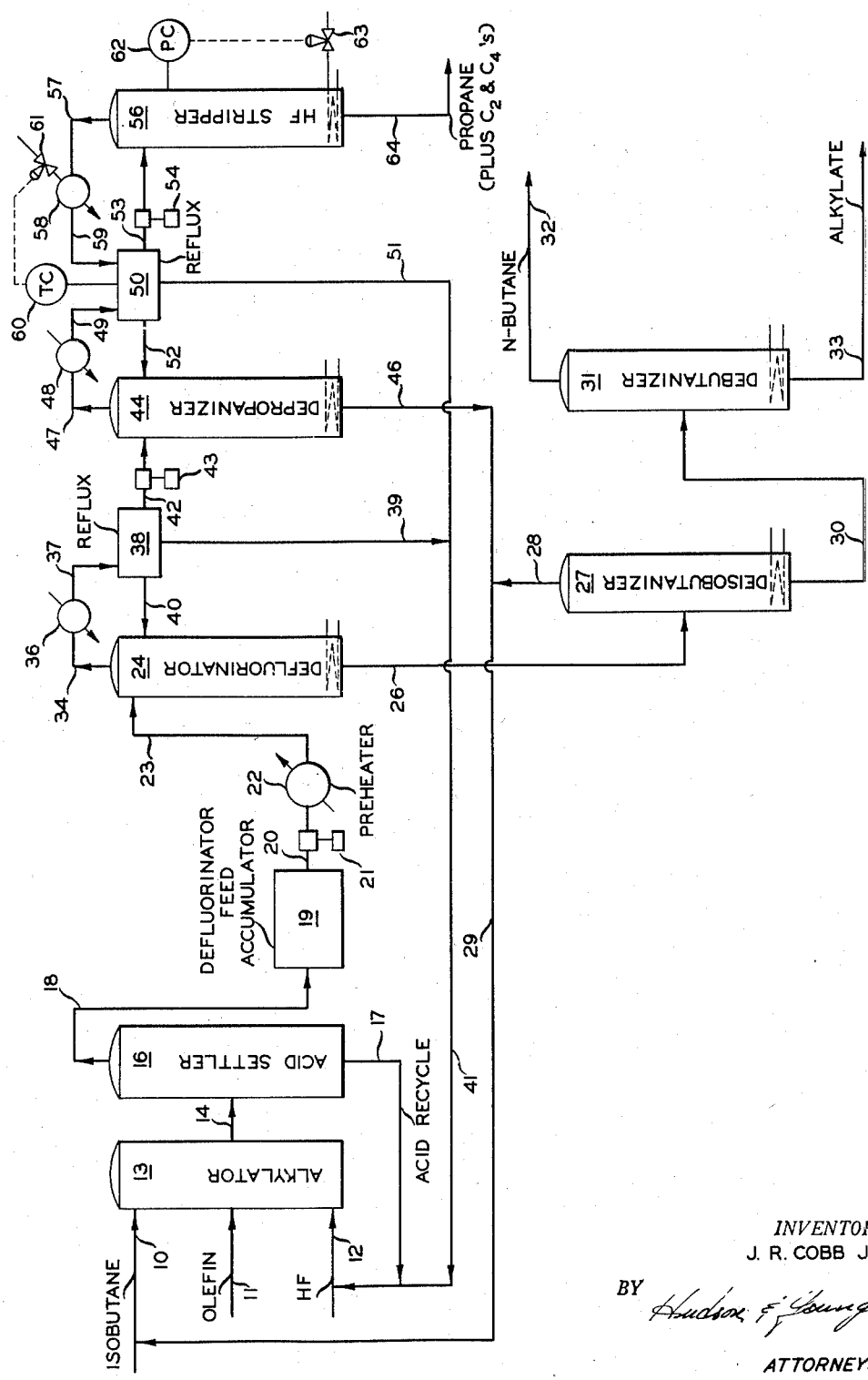
INVENTOR.
J. R. COBB JR.
BY *Hudson & Young*
ATTORNEYS

United States Patent Office 2,910,521
Patented Oct. 27, 1959

2,910,521

RECOVERY OF HYDROGEN FLUORIDE FROM A HYDROCARBON MIXTURE

Joseph R. Cobb, Jr., Bartlesville, Okla., assignor to Phillips Petroleum Company, a corporation of Delaware Application October 22, 1956, Serial No. 617,637

6 Claims. (Cl. 260—683.48)

This invention relates to a method of separating hydrogen fluoride from a liquid hydrocarbon stream containing ethane. In another aspect this invention relates to a method of controlling a hydrogen fluoride-hydrocarbon stripping process. In still another aspect this invention relates to a control system which enables the satisfactory separation of hydrogen fluoride from solution in a propane-ethane stream. In one of its more specific aspects this invention relates to a method of separating hydrogen fluoride from the effluent of an alkylation process wherein ethane is present in the olefin feed.

Hydrogen fluoride has proven to be a very useful catalyst in the conversion of hydrocarbons by various processes such as alkylation, isomerization, cracking, and cyclization. Liquid hydrogen fluoride has also been found useful as a refining agent or selective solvent in the removal of certain impurities from saturated hydrocarbons. An important industrial process involving the use of hydrogen fluoride is the alkylation of low boiling paraffinic hydrocarbons, particularly isobutane, with alkylating agents, particularly olefins such as propylene and butylenes, to form normally liquid, high octane number paraffins suitable for use in aviation fuels. In such alkylation processes the reactants are intimately contacted in liquid phase with liquid concentrated hydrofluoric acid, and the reaction effluents are passed through a series of recovery steps including phase separation and fractional distillation to separate the hydrogen fluoride from the hydrocarbon constitutents, and the low boiling reactants and impurities from the alkylate product. Generally, a final step in the recovery of the hydrogen fluoride from the hydrocarbons is a stripping operation which separates the hydrogen fluoride from solution in propane. This step is complicated when ethane is present in the feed to the alkylation reactor, as ethane tends to build up in the system and must be vented. Such venting causes loss of hydrogen fluoride and upsets process conditions. To avoid this the ethane is in some installations continuously passed to further separation steps. Another solution to this problem is to deethanize the olefin feed and thereby prevent ethane from entering the system altogether.

I have discovered a method of recovering hydrogen fluoride from such a hydrocarbon mixture, even with ethane present, by a method of process control which although quite simple and convenient to operate has heretofore gone unrecognized. According to the process and control system of my invention, hydrogen fluoride is stripped from solution in a hydrocarbon mixture which contains ethane while controlling the pressure in the stripping column by varying the heat input to the reboiler. The overhead condenser can be operated at constant or maximum capacity or under control by any variable not dependent upon column pressure. Preferably, for optimum operating conditions, the overhead condenser is operated at a substantially constant temperature. When operating according to the process of my invention, in the case of a feed substantially ethane free, the pressure of the stripping column remains low and the reboiler functions at the maximum desired setting, thereby stripping essentially all of the hydrogen fluoride from the hydrocarbon. As the concentration of ethane in the feed increases, the column pressure will tend to increase. This, however, results in a reduction of heat input to the reboiling section of the stripping column and the reboiling rate is decreased. This will allow some loss of hydrogen fluoride in the hydrocarbon stream from the bottom of the stripping column; but for any reasonable amount of ethane in the olefin feed to the alkylation reactor, for example less than 5 mol percent, the hydrogen fluoride loss can be held to about 0.03 mol percent of the hydrocarbon bottom stream. For most alkylation processes such a loss of hydrogen fluoride is acceptable, being generally less than that suffered by venting accumulated ethane from the system. Also such a low percentage of hydrogen fluoride in the hydrocarbon bottoms, which are predominantly propane in an alkylation process, does not prevent subsequent use of the hydrocarbon as a fuel or for olefin production by cracking and dehydrogenation.

It is an object of my invention to provide a method of separating hydrogen fluoride from a hydrocarbon stream containing ethane. It is another object of my invention to enable the recovery of hydrogen fluoride in a hydrogen fluoride alkylation process where ethane is present in the alkylation feed without venting the ethane or using additional separation steps. It is another object of my invention to provide a method of controlling the process of stripping hydrogen fluoride from a hydrocarbon mixture predominantly propane but containing some ethane in such a manner that substantially all of the ethane is retained in the propane stream while holding the loss of hydrogen fluoride in the propane stream to a minimum. It is still another object of my invention to provide a control system which will accomplish these ends. Further objects, advantages, and features of my invention will become apparent to those skilled in the art from the following discussion and the accompanying drawing which is a schematic diagram of one embodiment of my invention as applied to a hydrogen fluoride alkylation process.

While my invention applies in its broad aspect to the separation of hydrogen fluoride from hydrocarbon mixtures containing ethane, it is of particular importance and can be used most advantageously in the separation of hydrogen fluoride from solution in propane which also contains small amounts of ethane and other low boiling hydrocarbons such as butane. The problem for which my invention presents a solution arose in the hydrogen fluoride alkylation of isobutane and propylene to produce alkylate useful in high octane aviation gasoline, and it is this type of a process for which my invention is particularly suited. Accordingly, my invention will be described in detail in such an embodiment.

Referring now to the drawing which shows schematically an alkylation process in which my invention can be used, isobutane is fed by way of conduit 10, olefin fed by way of conduit 11, and hydrofluoric acid by conduit 12 to alkylator 13 wherein these feed materials are commingled under alkylation conditions, thus obtaining an alkylation effluent containing the desired alkylate products. The conditions of temperature, pressure, and reaction time, as well as the ratios of isobutane to olefin and of hydrocarbon to acid are well known in the art.

Although these conditions do not form a part of the present invention, for exemplary purposes suitable conditions are set forth as follows: temperature, 90 to 115° F.; pressure, 80 to 175 pounds per square inch gauge; average reaction time, in the order of about 5 to 15 minutes. Rapid agitation is maintained to insure intimate contact between the acid and hydrocarbon phases. The ratio of isobutane to alkylating agent or olefin can be about 6:1 parts by weight and the acid to hydrocarbon ratio can be about 2:1 parts by weight.

The resulting effluent mixture from alkylator 13 is passed by way of conduit 14 to a settler 16 in which the mixture is separated into an acid phase and a hydrocarbon phase. The acid phase is recycled by way of conduit 17 to conduit 12 and back to the alkylator with the fresh acid feed. The hydrocarbon phase is passed from settler 16 by way of conduit 18 into defluorinator feed accumulator 19. From the accumulator the hydrocarbon phase which contains dissolved hydrogen fluoride is pumped through conduit 20 by pump 21 into preheater 22 where it is heated to a temperature suitable for defluorination. The mixture is then passed through conduit 23 to defluorinator 24 wherein a defluorinated alkylation effluent is separated from the remaining hydrogen fluoride and lower boiling hydrocarbons.

This defluorinated alkylation effluent contains isobutane, normal butane, and heavier hydrocarbons. It is passed by way of conduit 26 into deisobutanizer 27 in which isobutane is separated therefrom. This isobutane is passed by way of conduit 28 and conduit 29 to conduit 10 where it is introduced with fresh isobutane feed to the alkylation reactor 13. From the bottom of deisobutanizer 26 the higher boiling product is withdrawn through conduit 30 and passed to debutanizer 31 from which the overhead product is normal butane in conduit 32 and the bottom product in conduit 33 is the debutanized alkylate product. This alkylate product can then be passed to further processing steps which are well known to those skilled in this art.

The overhead from defluorinator 24 contains isobutane, hydrogen fluoride, propane, and gases lighter than propane. This overhead passes through conduit 34 to cooler condenser 36. The condensed stream flows through conduit 37 to accumulator 38. In accumulator 38 another phase separation occurs forming an acid phase and a hydrocarbon phase. Hydrogen fluoride from the acid phase is removed through conduit 39 and returned by way of conduit 41 to conduit 12 where it is passed with fresh acid to reactor 13. Reflux for defluorinator 24 is provided from the hydrocarbon phase in accumulator 38 passing to the defluorinator by way of conduit 40. Production quantities of hydrocarbon, still containing dissolved hydrogen fluoride, are passed through conduit 42 by pump 43 to depropanizer 44.

Isobutane is removed from the hydrogen stream in the depropanizer, withdrawn through conduit 46 and recycled by way of conduit 29 to conduit 10 and thence to alkylator 13. The overhead in depropanizer 44 passes by way of conduit 47, cooler condenser 48, and conduit 49 to accumulator 50 in which another phase separation occurs. An acid phase is formed and recycled through lines 51, 41, and 12 to alkylator 13, and a hydrogen phase is formed and used as reflux, passing through line 52 to depropanizer 44. Production quantities of hydrocarbon containing some dissolved hydrogen fluoride are passed through line 53 by pump 54 to hydrogen fluoride stripper 56.

This feed material to stripper 56 is predominantly propane, containing some dissolved hydrogen fluoride and some isobutane and normal butane; and when ethane is present in the feed material to the alkylator, this ethane will also be present in the feed to the hydrogen fluoride stripper 56. Liquid hydrocarbon and acid mixture is passed downwardly through the stripping column and rising vapors from the reboiler section strip substantially all of the hydrogen fluoride from the hydrocarbon. Vapors of hydrogen fluoride, propane, and ethane pass overhead through conduit 57, cooler condenser 58 and conduit 59 into reflux accumulator 50. Here the phase separation occurs that was previously described, the acid being recycled to the alkylator and the hydrocarbon passed with the feed stream to the stripping column 56 as reflux.

The cooler condenser 58 is controlled to maintain a substantially constant top column temperature by temperature controller 60 which regulates the supply of cooling water flowing to condenser 58 through valve 61. The temperature sensitive element of temperature controller 60 can be located at any point in the reflux system at the top of stripping column 56 and is shown positioned in reflux accumulator 50. With the top column temperature maintained substantially constant, under equilibrium conditions, it can be seen that as the amount of ethane in the feed to the stripping column increases, the pressure of the column will likewise tend to increase. At a maximum pressure which is determined by the desired removal of ethane in the stripper bottoms, pressure controller 62 in pressure communication with column 56 regulates steam valve 63 which supplies heat to the reboiling section of the stripping column. As the pressure in the column tends to increase above the desired setting the heat input to the column is decreased and the reboiling rate in the bottom of the column is cut back. This will maintain the desired column pressure and allow substantially all of the ethane to be removed with the bottoms product through conduit 64.

This bottoms product is predominantly propane but contains any isobutane or normal butane present in the feed to the stripping column. When operating according to the control methods of my invention, this bottoms product will also contain substantially all of the ethane which is fed to the alkylation system. The bottoms product will also contain some hydrogen fluoride, but for any reasonable amount of ethane in the alkylator feed this hydrogen fluoride amount can be held to a satisfactory minimum. For example, the amount of ethane in the olefin feed is seldom in excess of 5 mol percent, in which case the hydrogen fluoride in the stripper bottoms product can be held to about 0.03 mol percent, which is satisfactory under most operating conditions.

This method of controlling the hydrogen fluoride recovery process is simple but quite unique. Hydrogen fluoride in mixtures with low boiling hydrocarbons such as propane behaves in an abnormal fashion not expected by reason of comparative boiling points alone. Although hydrogen fluoride has a higher boiling point than either propane or ethane it can be separated from a mixture of these materials as an overhead product because of its abnormally high activity coefficient in such mixtures. The activity coefficient is a ratio of the actual escaping tendency of hydrogen fluoride in a propane solution to its escaping tendency in an "ideal" solution under the same conditions of temperature and pressure. An activity coefficient of 1.0 indicates an ideal balance and that at any given temperature at equilibrium the concentration of a component in the vapor phase is directly proportional to its concentration in the liquid phase. Hydrogen fluoride in propane solution has unusually high activity coefficients at various temperatures and concentrations as shown by Table I. This indicates a much greater escaping tendency for hydrogen fluoride from such a solution, and thereby accounts for its ability to be separated by such a stripping operation as described. Although these facts have been known and employed in the art, it has not been suggested prior to my invention that the problem of ethane accumulation in the alkylation system could be satisfactorily solved by the control means and steps which I have here described.

TABLE I

| Mol percent of hydrogen fluoride in liquid | Activity coefficients of hydrogen fluoride in propane | | |
|---|---|---|---|
| | 90° F. | 120° F. | 150° F. |
| 0.00 | 35.0 | 23.2 | 16.3 |
| 0.02 | 30.0 | 21.0 | 14.9 |
| 0.04 | 26.5 | 18.8 | 13.7 |
| 0.06 | 23.3 | 16.8 | 12.5 |

For separation of hydrogen fluoride from a propane-ethane mixture such as would be encountered in an alkylation process, the hydrogen fluoride stripping operation can be conducted at pressures over a generally broad range, for example, as low as 150 pounds per square inch absolute up to 400 pounds per square inch absolute. The preferred operating pressure for such a stripping zone is from about 250 to 300 pounds per square inch absolute. Operating within this range will enable an efficient separation to proceed. The condenser temperature should be the lowest which is economical to effect and usually depends upon the temperature of the cooling water available. Generally, temperatures of about 90 to 130° F. are satisfactory. It can be seen that while for smoothness of column operation it is desirable to maintain a relatively constant condenser temperature, advantages can be realized from the practice of this invention by operating the condenser at a fixed capacity or at maximum capacity or controlled by other variables not dependent upon column pressure. In general, if the latter is done the condenser capacity should increase to meet increased load. With the condenser at maximum capacity, as ethane increases in the stripper column feed, pressure will likewise tend to increase and the reboiling rate is reduced accordingly. The temperature in the reboiler will be fixed by the other conditions of pressure and temperature control, but will generally be about 200° F.

In further description of my invention a specific embodiment will be described which should be interpreted as exemplary only and not to limit my invention unduly. In describing this embodiment, reference is made to structure depicted in the drawing.

An alkylation reactor effluent is passed through a acid settler and defluorinated as described in the discussion of the drawing. A depropanizer feed predominately isobutane with considerable amounts of propane and normal butane and small amounts of ethane and hydrogen fluoride is fed to the depropanizer through conduit 42. Substantially all of the isobutane and normal butane with some propane is separated in the depropanizer as bottoms product and recycled to the alkylation reactor. The depropanizer is operated with a bottom temperature and pressure of about 200° F. and 290 pounds per square inch gage and a top temperature and pressure of about 130° F. and 287 pounds per square inch gage. Depropanizer overhead containing all of the hydrogen fluoride and ethane and most of the propane is condensed and allowed to settle in accumulator 50. Substantially all of the hydrogen fluoride is recycled to the alkylator from the acid phase of the accumulator.

The remaining hydrocarbon phase, after providing reflux for the depropanizer, is passed to a hydrogen fluoride stripping zone operated at a pressure of about 275 pounds per square inch absolute. Hydrogen fluoride is stripped from the hydrocarbon phase in the stripping zone and returned to the accumulator. Propane, ethane and hydrogen fluoride vapors in the stripper overhead are condensed while maintaining the condenser temperature at about 100° F. A pressure controller on the stripping column varies the reboiling rate so that the column pressure is maintained at about 275 pounds per square inch absolute, thus preventing a build-up of ethane in the vapor phase of the system. All of the ethane entering the system is removed with the propane from the stripping column bottoms and the hydrogen fluoride in the column bottoms is maintained about 0.03 mol percent or less. Stream compositions for this embodiment operating under the conditions described with reference to the conduits of the drawing are shown in Table II.

TABLE II

| Stream | Line number (see drawing) | Stream compositions for hydrogen fluoride removal system, depropanizer and hydrogen fluoride stripper (based on 100 mols of stripping column bottoms) | | | | |
|---|---|---|---|---|---|---|
| | | Hydrogen fluoride | Ethane | Propane | Isobutane | N-butane |
| Depropanizer feed | 42 | 4.11 | 1.29 | 125.38 | 554.68 | 76.20 |
| Depropanizer bottoms | 46 | | | 28.40 | 553.00 | 76.18 |
| Hydrogen fluoride phase removal | 51 | 4.08 | | | | |
| Hydrogen fluoride stripper bottoms | 64 | 0.03 | 1.29 | 96.98 | 1.68 | 0.02 |
| Overhead | 57 | 6.37 | 5.31 | 39.89 | 0.29 | |
| Total feed including recycle | 53 | 6.40 | 6.60 | 136.87 | 1.97 | 0.02 |

As can be seen from the above description and example, my invention can be applied to an alkylation process in which the feed streams are contaminated with a small amount of ethane to effect recovery of substantially all of the hydrogen fluoride with complete removal of the ethane from the system. This can be done without loss of vapors to the atmosphere, without elaborate secondary recovery steps and without upsetting the control conditions of the hydrogen fluoride stripping column to periodically vent excess ethane which has built up in the system.

I claim:

1. A process for separating hydrogen fluoride from a liquid mixture comprising hydrogen fluoride, propane and ethane which comprises passing said liquid mixture downwardly through a stripping zone in contact with rising stripping vapors thereby forming an overhead vapor stream comprising hydrogen fluoride, propane and ethane and a bottoms liquid product comprising propane, ethane and a small amount of hydrogen fluoride, boiling said bottoms product to provide said stripping vapors, condensing vapors from said overhead vapor stream forming a liquid condensate, maintaining a substantially constant condensate temperature above the boiling point of ethane at the operating pressure by controlling the rate of coolant supplied to said condensing step, maintaining a substantially constant pressure in said stripping zone by varying the boiling rate of said bottoms product in response to said pressure thereby reducing the boiling rate when increased amounts of ethane in said mixture tend to cause pressure increases in said stripping zone, separating hydrogen fluoride from said condensate by phase separation thereby forming an acid phase and a hydrocarbon phase, withdrawing said acid phase, refluxing hydrocarbon phase to said stripping zone, and withdrawing liquid product from said bottoms product containing a small amount of hydrogen fluoride and substantially all of the ethane fed to said stripping zone in said mixture.

2. A process for separating hydrogen fluoride from a mixture of hydrocarbons containing ethane which comprises stripping hydrogen fluoride from said mixture of hydrocarbons in a stripping zone thereby producing an overhead vapor steam and a bottom liquid stream, condensing vapors from said overhead vapor stream to form a condensate, controlling the rate of coolant supplied to said condensing step to maintain a substantially constant temperature of said condensate above the boiling point of ethane at the operating pressure, and controlling the pressure in said stripping zone by varying the heat input thereto so that said ethane is removed from said stripping zone as a part of said bottom liquid stream.

3. A process for separating hydrogen fluoride from a mixture of liquid hydrocarbons containing ethane and dissolved hydrogen fluoride which comprises passing said mixture downwardly through a stripping zone, passing stripping vapors upwardly through said zone in contact with said mixture thereby stripping hydrogen fluoride from said mixture and forming an overhead vapor stream and a bottom liquid product, boiling said bottom liquid product to produce said stripping vapors, condensing vapors from said overhead vapor stream by passing coolant in heat exchange relation therewith thereby forming a condensate comprising hydrogen fluoride and hydrocarbons, maintaining the temperature of said condensing step substantially constant and above the boiling point of ethane at the operating pressure by controlling the rate of coolant supplied to said condensing step, separating said condensate by phase separation into an acid phase and a hydrocarbon phase, withdrawing said acid phase, refluxing hydrocarbon phase to said stripping zone, supplying heat to said stripping zone for said boiling step, controlling the amount of said heat thus supplied in response to pressure of said stripping zone, thereby maintaining pressure in said zone substantially constant and in the range of 150 to 400 pounds per square inch absolute, and withdrawing the liquid bottoms product containing substantially all of the ethane feed to said stripping zone.

4. A method of separating hydrogen fluoride from a mixture comprising hydrogen fluoride, propane and ethane which comprises passing said mixture to a stripping zone wherein hydrogen fluoride is stripped from said mixture forming an overhead vapor stream and a bottoms liquid product, said overhead vapor stream comprising hydrogen fluoride, propane and ethane and said bottoms liquid product comprising propane, substantially all of said ethane fed to said stripping zone and a small amount of hydrogen fluoride, condensing vapors from said overhead stream with a heat exchange medium forming a condensate thereby, controlling the temperature of the condensate of said condensing step in the range of 90 to 130° F. by controlling the rate of supply of said heat exchange medium thereto, separating said condensate by phase separation into an acid phase and a hydrocarbon phase, withdrawing the acid phase, refluxing hydrocarbon phase to said stripping zone, supplying heat to said stripping zone thereby boiling the bottoms product, and varying the rate of supply of said heat to maintain the pressure in said stripping zone substantially constant and in the range of 150 to 400 pounds per square inch absolute.

5. In a hydrogen fluoride alkylation process having an olefin feed stream, an isobutane feed and an acid feed stream in which said olefin feed stream contains up to five mol percent ethane, the improved method of separating hydrogen fluoride from a mixture of hydrocarbons comprising propane, hydrogen fluoride and ethane, said mixture produced as a separation product of said alkylation process which comprises passing said mixture to a stripping zone, stripping hydrogen fluoride from said mixture thereby forming an overhead vapor stream comprising hydrogen fluoride, propane and ethane and a bottoms liquid product substantially free of hydrogen fluoride; boiling said bottoms liquid product; producing a control output which varies as a function of the pressure in said stripping zone; controlling said boiling step in response to said control output thereby maintaining the pressure of said stripping zone substantially constant and in the range of 250 to 300 pounds per square inch absolute; condensing said overhead vapors with heat exchange medium to form a condensate; producing a second control output which varies as a function of the temperature of said condensate; controlling the rate of flow of said heat exchange medium in response to said second control output, thereby maintaining the temperature of said condensate substantially constant and in the range of 90 to 130° F.; separating said condensate into an acid phase and a hydrogen phase; withdrawing said acid phase; recycling said acid phase to the alkylation process; refluxing hydrocarbon phase to said stripping zone; and withdrawing a bottoms product from said stripping zone which comprises propane, up to 0.03 mol percent hydrogen fluoride and substantially all of said ethane introduced to said alkylation process in said olefin feed stream.

6. In a hydrogen fluoride alkylation process wherein isobutane, olefin and hydrogen fluoride are fed to an alkylation reactor and a reactor effluent comprising alkylate product, hydrogen fluoride, normal butane, isobutane, propane and ethane is withdrawn, the improved method of recovering hydrogen fluoride from said reactor effluent when ethane is present in said olefin feed in amounts up to about five mol percent which comprises passing said effluent stream to a settling zone; effecting a phase separation between hydrocarbon and hydrogen fluoride in said settling zone; recycling said hydrogen fluoride from said settling zone to the reactor; passing said hydrocarbon containing dissolved hydrogen fluoride to a first fractionation zone; separating in said first fractionation zone a substantially acid-free bottoms product comprising alkylate and butane from an overhead product comprising hydrogen fluoride and hydrocarbons boiling below normal butane; condensing and settling said overhead product to effect separation of a hydrogen fluoride phase from a hydrocarbon phase; recycling said hydrogen fluoride phase to the reactor; passing said hydrocarbon phase containing some dissolved hydrogen fluoride to a second fractionation zone; separating in said second fractionation zone a substantially acid-free bottoms product comprising isobutane from an overhead stream comprising hydrogen fluoride, propane and ethane; condensing and settling said overhead stream to effect separation of hydrogen fluoride from condensed propane and ethane; recycling said hydrogen fluoride thus separated to the reactor; passing said condensed propane and ethane with some dissolved hydrogen fluoride to a stripping zone operating at a pressure in the range of about 250 to 300 pounds per square inch absolute; separating in said stripping zone a liquid bottoms product comprising propane, ethane and up to 0.03 mol percent hydrogen fluoride from overhead vapors comprising hydrogen fluoride, propane and ethane; boiling said liquid bottoms product to produce stripping vapors; condensing said overhead vapors to form a condensate; settling said condensate to separate hydrogen fluoride therefrom; maintaining the condensate of said condensing step at a substantially constant temperature in the range of about 90 to 130° F.; recycling said hydrogen fluoride thus separated from said condensate to the reactor; refluxing a remainder of said condensate to said stripping zone; maintaining the pressure of said stripping zone substantially constant by varying the rate of said boiling step thereby reducing the boiling rate as ethane tends to build up in said overhead vapors and increase the pressure in said stripping zone; and removing from said stripping zone said bottoms product containing substantially all of the ethane in said reactor effluent.

References Cited in the file of this patent

UNITED STATES PATENTS

| | | |
|---|---|---|
| 2,357,113 | Houghland et al. | Aug. 29, 1944 |
| 2,417,669 | Vinyard | Mar. 18, 1947 |
| 2,504,464 | Stanley | Apr. 18, 1950 |
| 2,759,032 | Dixon | Aug. 14, 1956 |